(12) United States Patent
Peterson et al.

(10) Patent No.: US 11,225,319 B2
(45) Date of Patent: Jan. 18, 2022

(54) DUAL DOOR STALL CORRECTION MECHANISM

(71) Applicant: The Boeing Company, Chicago, IL (US)

(72) Inventors: Miranda Peterson, Seattle, WA (US); Kevin R. Tsai, Seattle, WA (US)

(73) Assignee: The Boeing Company, Chicago, IL (US)

(*) Notice: Subject to any disclaimer, the term of this patent is extended or adjusted under 35 U.S.C. 154(b) by 156 days.

(21) Appl. No.: 16/801,976

(22) Filed: Feb. 26, 2020

(65) Prior Publication Data

US 2021/0261238 A1 Aug. 26, 2021

(51) Int. Cl.
*B64C 9/18* (2006.01)
*B64C 13/30* (2006.01)
*B64C 21/06* (2006.01)

(52) U.S. Cl.
CPC .............. *B64C 13/30* (2013.01); *B64C 9/18* (2013.01); *B64C 21/06* (2013.01)

(58) Field of Classification Search
CPC .... B64C 9/02; B64C 9/04; B64C 9/10; B64C 9/14; B64C 9/16; B64C 9/18; B64C 2009/143; B64C 21/06; B64C 13/16; B64C 13/30
See application file for complete search history.

(56) References Cited

U.S. PATENT DOCUMENTS

| | | | | |
|---|---|---|---|---|
| 2,169,416 A * | 8/1939 | Griswold | ................... | B64C 9/16 244/216 |
| 2,772,058 A * | 11/1956 | Grant | ...................... | B64C 21/02 244/216 |
| 2012/0234983 A1* | 9/2012 | Wildman | .................. | B64C 9/14 244/215 |
| 2012/0248257 A1* | 10/2012 | Eichhorn | .................. | B64C 9/04 244/214 |
| 2013/0320151 A1* | 12/2013 | Kordel | ...................... | B64C 9/16 244/215 |
| 2014/0145039 A1* | 5/2014 | Beyer | ....................... | B64C 9/16 244/215 |
| 2017/0259908 A1* | 9/2017 | Omeara | .................... | B64C 9/16 |
| 2019/0241250 A1* | 8/2019 | Hencke | ..................... | B64C 9/18 |

* cited by examiner

*Primary Examiner* — Philip J Bonzell
*Assistant Examiner* — Tye William Abell
(74) *Attorney, Agent, or Firm* — Felix L. Fischer

(57) ABSTRACT

A wing stall compensation mechanism employs an upper door having forward upper hinge end pivotally coupled to an upper wing structure for rotation about an upper axis and a free aft upper end. A lower door has a free aft lower end and a forward lower hinge end pivotally coupled to a lower wing structure for rotation about a lower axis and a 2-bar coupler linkage is disposed between and pivotally coupled to the upper door and lower door. Downward rotation of the upper door in response to wing surface airflow separation causes contraction of the coupler linkage inducing upward rotation of the lower door from a closed position that inhibits airflow through a flap slot to an open position that enables airflow through the flap slot, to thereby restore wing surface airflow effectiveness.

20 Claims, 7 Drawing Sheets

DUAL DOOR STALL CORRECTION MECHANISM

BACKGROUND INFORMATION

Field

This disclosure relates generally to the field of aircraft wing systems and, more particularly to a passive stall correction system having a hinged upper door sensing upper wing flow connected to a lower door, the upper door rotating in response to flow separation and opening the lower door for slotted flow entry.

Background

Aircraft wings in flight have a laminar airflow creating a pressure profile over the top of the wing and bottom of the wing. In high angle of attack orientations, the airflow over the top of the wing incurs separation or turbulence resulting in loss of laminar flow referred to as wing stall. Loss of laminar air flow on top of the wing surface may causes cause loss of lift or reduced control effectiveness. Various mechanisms have been employed to provide stall correction or prevention. Flap systems including both plain and slotted flaps allow aircraft operation at higher angles of attack by preventing early flow separation therefore preventing a stall condition. Current solutions exist for detecting and correcting a stall using pilot reaction and feedback and/or sensors with automatic response via control surfaces. However, these solutions rely on relaying information from the area of the stall to the decision maker (computer or pilot) and then relaying the desired action to the acting parts. This causes some lag in response.

SUMMARY

Exemplary implementations of a wing stall compensation mechanism employ an upper door having forward upper hinge end pivotally coupled to an upper wing structure for rotation about an upper axis and a free aft upper end. A lower door has a free aft lower end and a forward lower hinge end pivotally coupled to a lower wing structure for rotation about a lower axis and a coupler linkage is disposed between and pivotally coupled to the upper door and lower door. Downward rotation of the upper door in response to wing surface airflow separation causes contraction of the coupler linkage inducing upward rotation of the lower door from a closed position that inhibits airflow through a flap slot to an open position that enables airflow through the flap slot, to thereby restore wing surface airflow effectiveness.

The exemplary implementations provide a method for wing stall compensation by creating suction on an upper door with laminar flow over an upper surface of a wing, the upper door configured for rotation about an upper axis and maintaining the upper door in a closed position. Tension induced by the upper door is reacted in a coupler linkage connected from the upper door to a lower door rotatable about a lower axis. Upon interruption of laminar flow due to separation or turbulence over the upper door with resulting reduced suction, the upper door is rotated downward about the upper axis. The lower door is counter-rotated about the lower axis to an open position with the coupler linkage. Air flow from a lower surface of the wing is allowed through a flap slot exposed by the open lower door and open upper door to enhance stabilized flow on the upper surface aft of the flap slot.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein feature two doors, an upper door pivotally coupled on an upper surface and a lower door pivotally coupled on a lower surface of a wing or wing-like structure. The hinged upper door and lower door are pivotally connected by a coupler During normal flight, laminar flow over the wing provides a pressure profile with a reduced pressure or suction force on the upper surface maintaining a closed position of the upper door and, through the hinged mechanism, a closed position of the lower door. Upon separation or turbulence in the airflow over the upper surface of the wing loss of suction force on the upper surface causes the upper door to rotate inward under gravitational force. The hinged mechanism, in response to the motion of the upper door falling inward pulls the lower door inward as well. Opening of the lower door allows airflow from the lower surface of the wing to divert through a slot opened by the upper and lower doors to the upper surface of the wing enhancing upper surface flow to encourage laminar flow to be reinstated on the upper surfaces aft of the doors, correcting the stall.

Figure 1A:
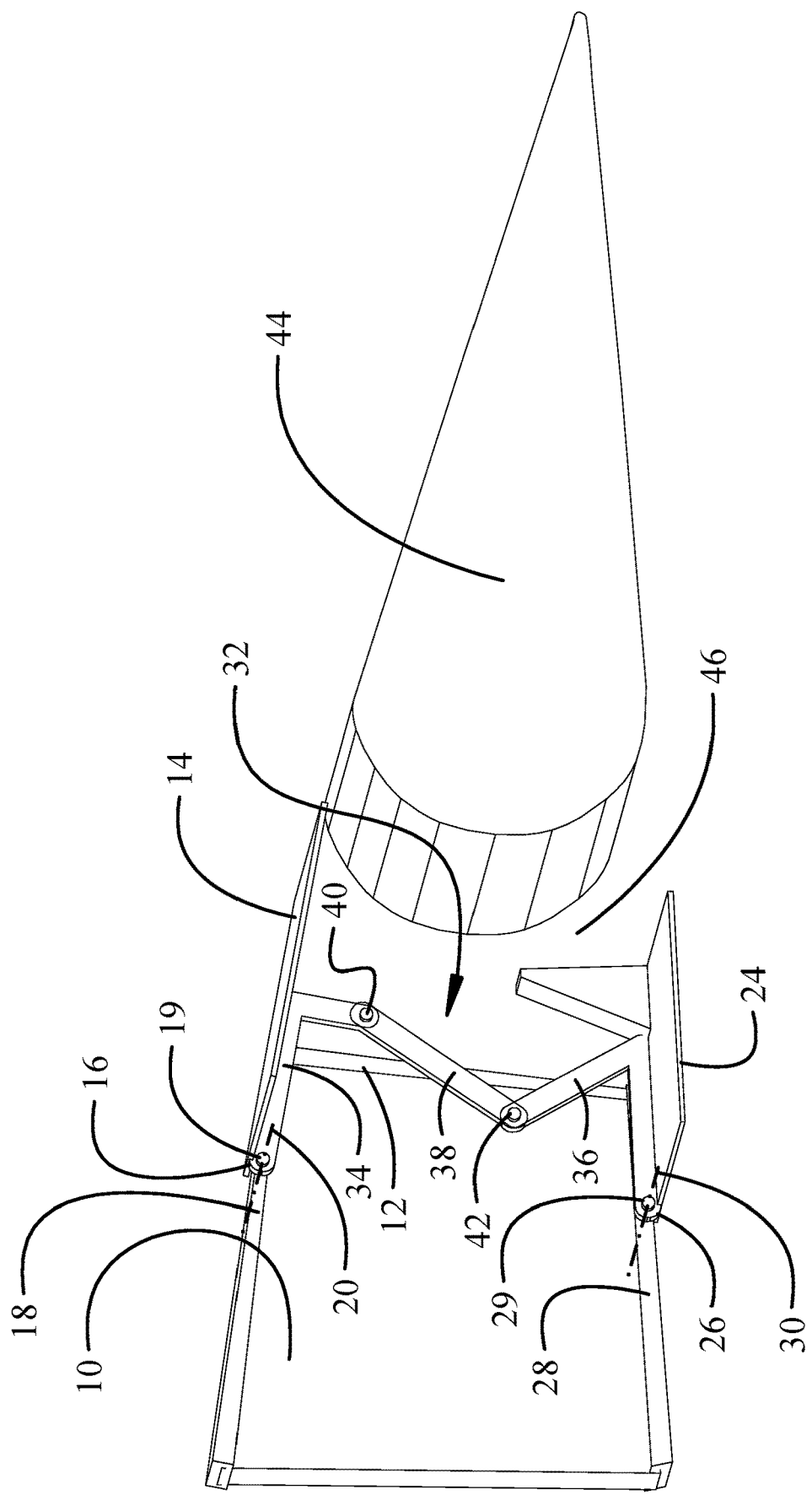
FIG. 1A is a pictorial representation of an example implementation of the stall compensation mechanism.
Figure 1B:
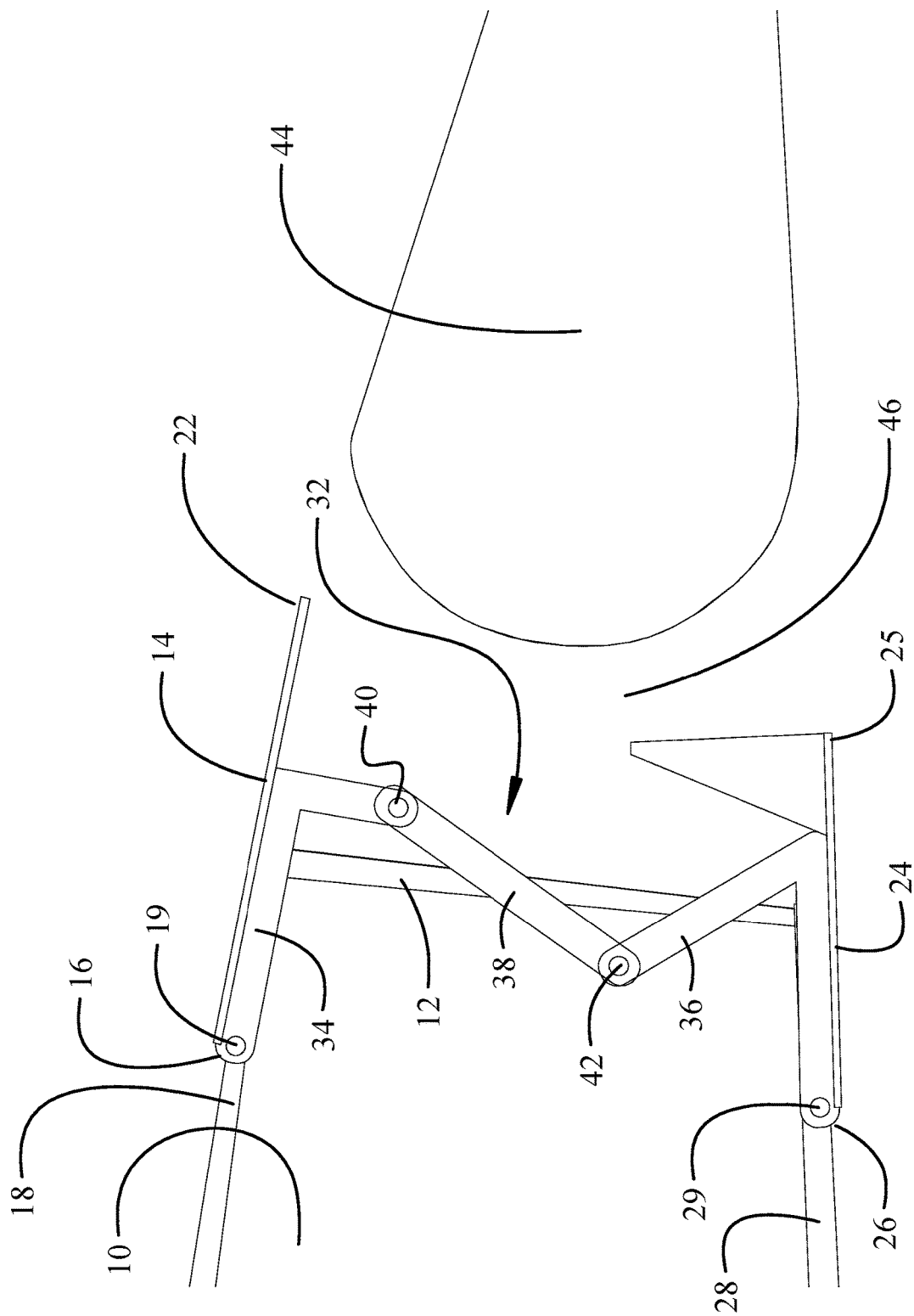
FIG. 1B is a side view of the implementation.

Referring to the drawings, an example implementation of a wing stall compensation mechanism is shown in FIGS. 1A and 1B. A wing structure, such as a rib 10 terminating in an aft edge 12, has an upper door 14 pivotally attached at a forward upper hinge end 16 to an upper structure 18 of a wing with an upper axle 19 for rotation about an upper axis 20. The upper door 14 has an aft upper free end 22, which is configured to move and/or rotate about the upper axis 20 between at least a closed position generally aligned with an upper surface of the wing flap 44 and a downward open position. A lower door 24 having an aft lower free end 25 is pivotally attached at a forward lower hinge end 26 to a lower structure 28 of a wing with a lower axle 29 for rotation about a lower axis 30, where the aft lower free end 25 is configured to move and/or rotate about lower axis 30 between at least a closed position generally aligned with a lower surface of the wing flap 44 and an open position. A coupler linkage 32 connects the upper door 14 to the lower door 24. For the example implementation, the coupler linkage 32 incorporates an upper bracket 34 connected to the upper door 14 and a lower bracket 36 connected to the lower door 24. The coupler linkage 32 connecting the hinged upper door 14 and lower door 24 may operate as a 4-bar linkage. A coupler 38 is pivotally attached to the upper bracket 34 with an upper pivot pin 40 and pivotally attached to the lower bracket 36 with a lower pivot pin 42. Upper pivot pin 40 is aft of lower pivot pin 42 for actuation of the coupler linkage, as will be described subsequently. An aft section of the wing, such as a wing flap 44, extends aft of the aft edge 12 with a flap slot 46 separating the flap 44 from the forward wing structure. In the drawings presented herein relative size of flap slot 46 and gaps between the upper door 14 and lower door 24 and the flap 44 are not to scale and are exaggerated for clarity.

Figure 2:
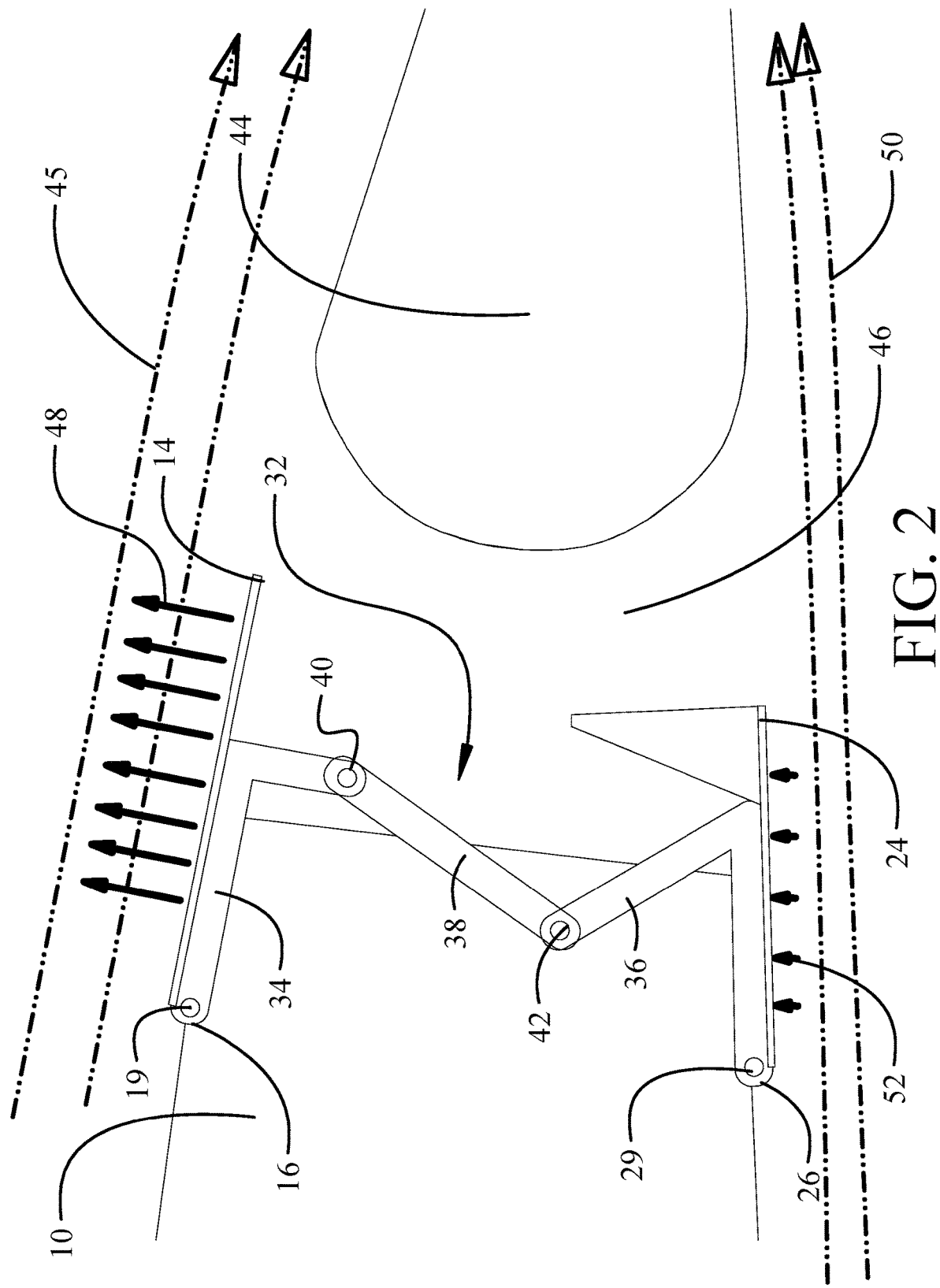
FIG. 2 is a side view showing the steady state aerodynamic forces urging the upper and lower doors to the closed position.

As seen in FIG. 2, with the wing in laminar flow and the associated pressure distributions over and under the wing, airflow (represented by arrows 45) over the top of the upper door 14 and flap 44 creates suction or upward pressure (represented by arrows 48) on the upper door 14. Airflow under the wing (as represented by arrows 50) produces pressure (represented by arrows 52) on the lower door 24. However, upward force on the upper door 14, creating a counter-clockwise moment about upper axis 20, provides tension through the coupler linkage 32 preventing upward rotation of lower door 24 about lower axis 30 away from a closed position relative to the wing flap 44.

Figure 3:
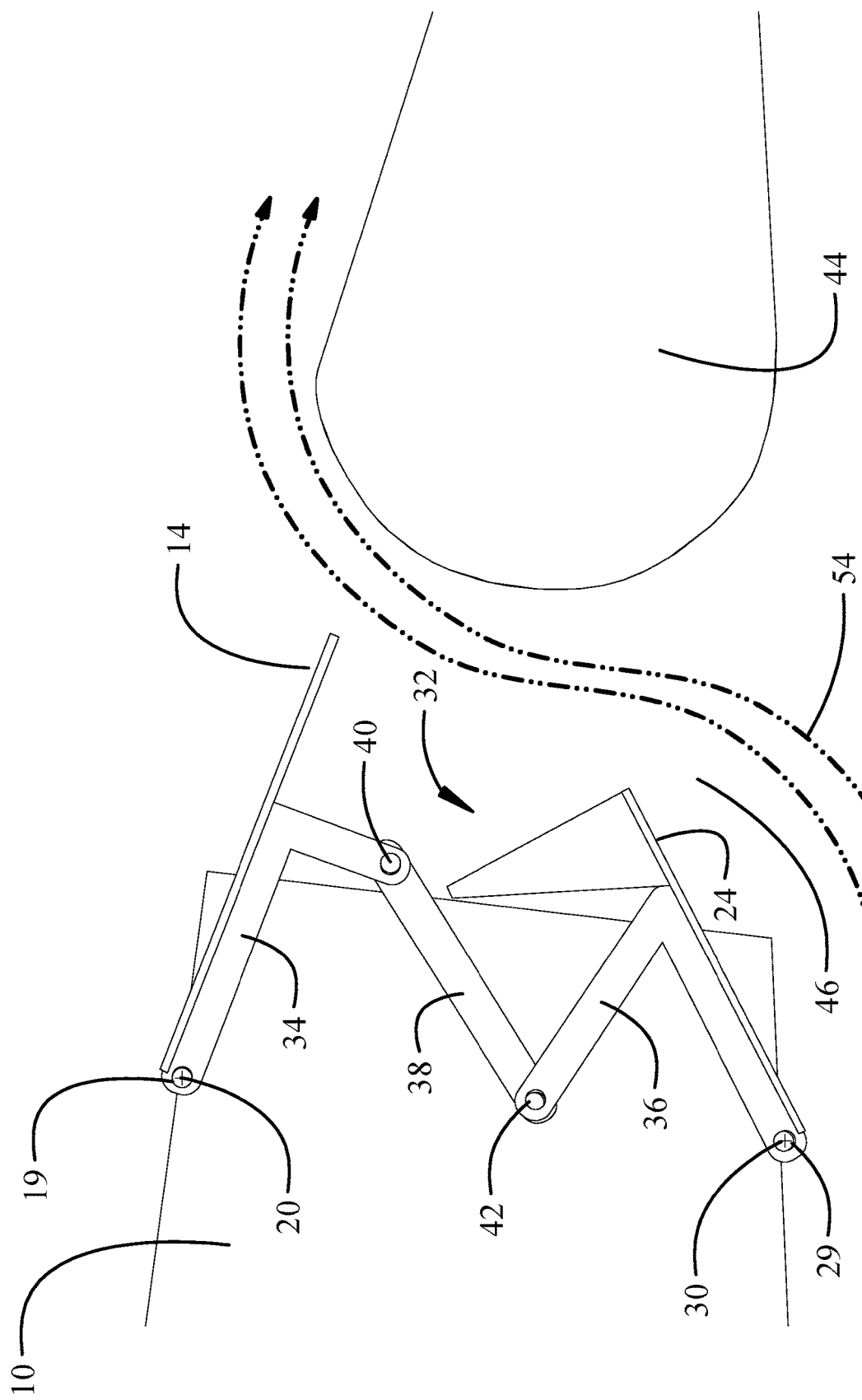
FIG. 3 is a side view showing an actuated condition of the stall compensation mechanism with the upper and lower doors in the open position.

If laminar flow over the upper surface is interrupted by separation of the flow or turbulent flow in a high angle of attack condition, the suction on the upper door 14 is substantially eliminated and the upper door rotates by gravitational force clockwise downward around upper axle 19 and upper axis 20 as seen in FIG. 3, such that the aft upper free end 22 moves and/or rotates towards the open position. The coupler linkage 32, due to relative placement of the upper and lower pivot pins 40, 42, contracts causing rotation of the lower door 24 counterclockwise upward about lower axle 29 and lower axis 30 from a closed position (as seen in FIG. 2 for laminar flow) to an open position (seen in FIG. 3), opening the flap slot 46 and inducing flow through the flap slot 46 (as represented by arrows 54) from the lower surface over the flap 44 enhancing aerodynamic performance. The coupler linkage, with the upper pivot pin 40 offset aft and below the upper axis 20 of rotation and aft of the lower pivot pin 42, and the lower pivot pin offset above and aft of the lower axis of rotation 30 provides counter rotation of the upper and lower doors, converting the clockwise rotation of the upper door 14 into a counterclockwise rotation of the lower door 24.

Figure 4:
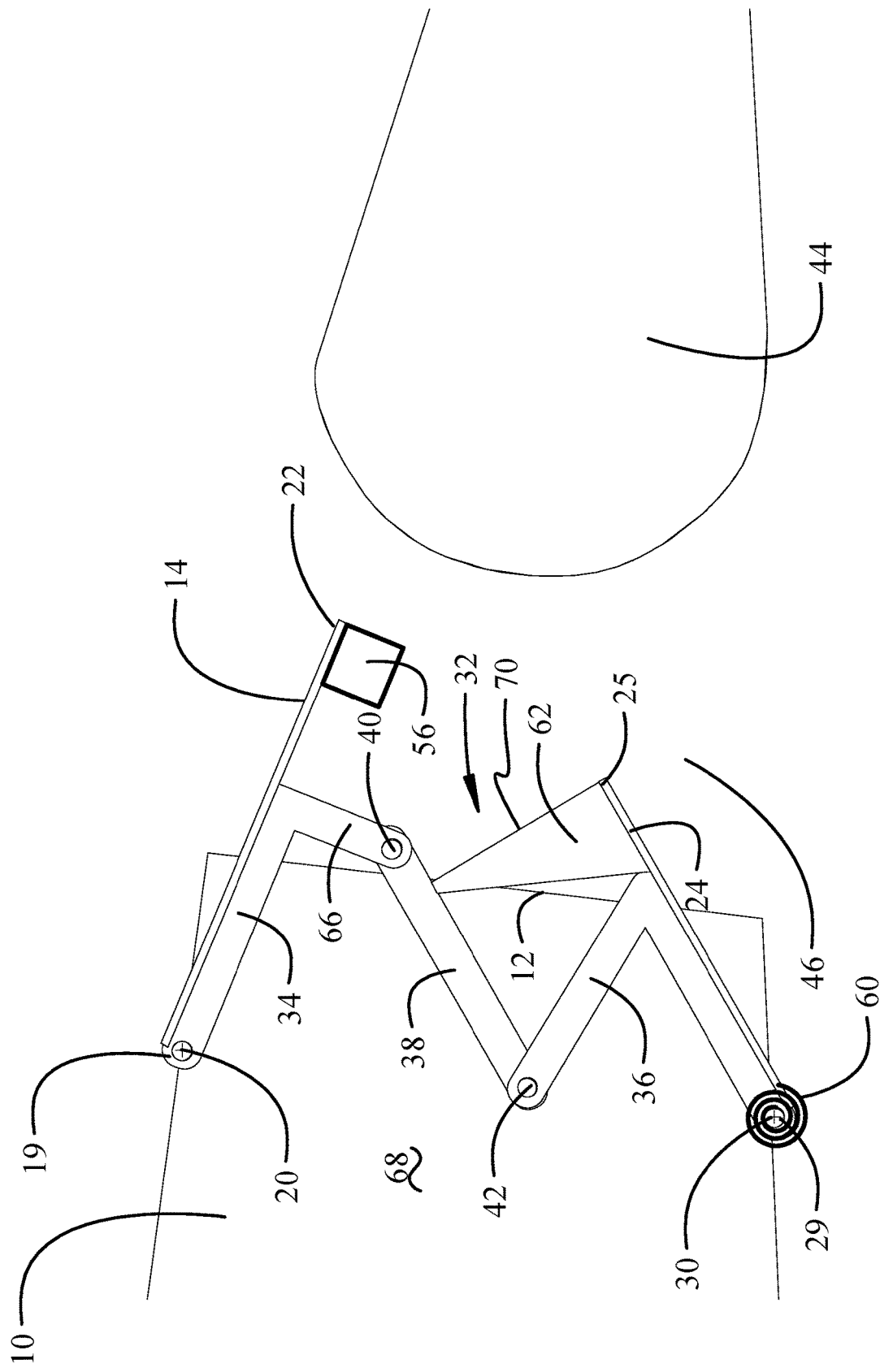
FIG. 4 is a side view showing the supplemental force elements and the hard stop in the open position.

To assist in the force balance between the upper and lower doors, a balance weight 56 is attached proximate the aft upper free end 22 of the upper door 14 to provide an additional clockwise downward force to enhance the rotational force about upper axis 20 as seen in FIG. 4. Additionally, a torsion spring 60 or other torsion device is employed providing a moment about the lower axis 30 to urge counterclockwise rotation of the lower door 24. Clockwise rotation of the lower door 24 to the closed position in reaction to tension in the coupler linkage 32 increases the potential energy in the torsion spring 60. One or both of these elements additionally assists in providing an open flap slot condition for operation of the aircraft on the ground or at low speeds during taxi or other ground operations.

A hard stop 62 proximate the aft lower free end 25 of the lower door 24 prevents over-rotation of the lower door 24 and, through the coupler linkage 32, limits downward rotation of the upper door 14. The implementation shown in FIG. 4 demonstrates engagement of the hard stop on the coupler 38. Alternatively, the hard stop may be configured to contact the depending arm 66 of the upper bracket 34 or aft edge 12 of the rib 10 in the fully rotated open position. Since the mechanism is biased to an open position without aerodynamic forces induced by high speed laminar flow, the hard stop 62 and the contacted coupler 38 or depending arm 66, or portions thereof, may extend laterally parallel to the upper and lower axes 20, 30 between ribs 10 in the wing to create a sealed wall preventing debris from entering the wing cove 68 between ribs 10 while the aircraft is on the ground. Any debris in the flap slot 46 will be shunted by the aft surface 70 of the hard stop 62 to drop out of the flap slot. The hard stop 62 has a predetermined length such that the hard stop is configured to engage the coupler 38 (or depending arm 66 or other structure) so as to limit rotation of the upper door 14 and lower door 24 towards each other, where the predetermined length of the hard stop is configured to limit said rotation to maintain a predetermined angular separation with respect to the coupler linkage coupling the upper door 14 and lower door 24 (such as a predetermined angle of about 50 degrees, for example).

Figure 5:
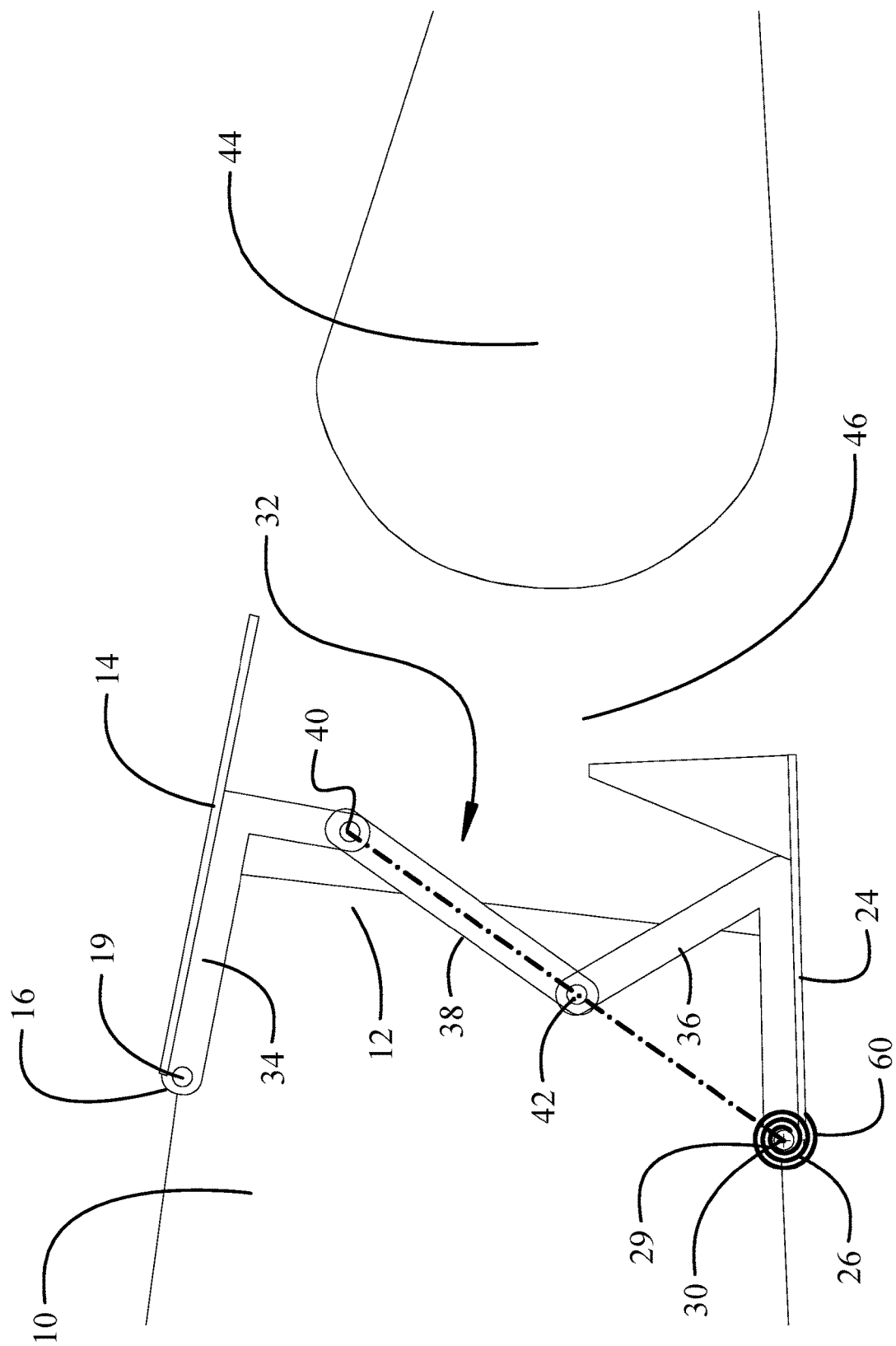
FIG. 5 is a side view demonstrating the position limitation of the upper and lower doors in the closed position by the coupler linkage; and, FIG. 6 is a flow chart of a method for passive stall prevention using the exemplary implementations.

The configuration of the coupler linkage 32 additionally provides a closed position limit for both the upper and lower door as seen in FIG. 5. In the closed position, the upper and lower pivot pins are aligned with the lower axis 30 with linear tension in coupler 38, induced by the suction force on the upper door 14, preventing further counterclockwise rotation of the upper door 14 and preventing rotation of the lower door 24. Torsion spring 60 overcomes any overcenter tendency allowing rotation of both doors upon relaxation of tension in the coupler 38.

The operation of the stall compensation mechanism is entirely passive. No actuation other than loss of reduced pressure (suction) on the upper door 14 (as supplemented by the balance mass and torsion spring) is required. No sensor is required to indicate stall and the mechanism automatically reacts to the stall. The operation of the mechanism restores control/effectiveness of surface that was lost due to stalled airflow and the mechanism returns to the closed position once laminar airflow (suction) is restored. While shown in the example implementation as associated with an aft flap on a wing, the stall compensation mechanism may be used for flow redirection on any wing like structure operating with pressure differential between an upper and lower surface.

Figure 6:
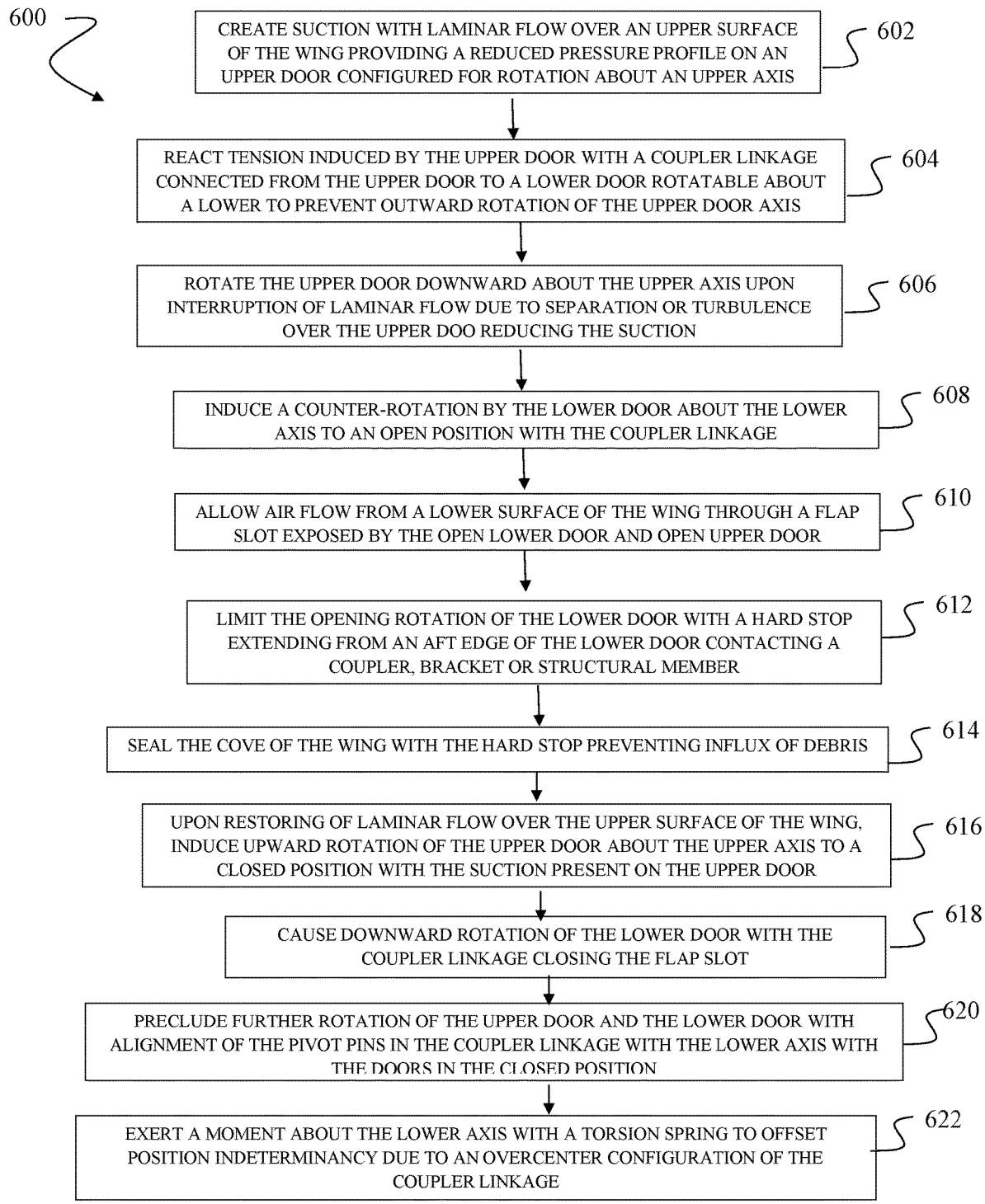

The implementations disclosed provide a method 600 for stall prevention as seen in FIG. 6. Laminar flow over an upper surface of wing providing a reduced pressure profile creates suction on an upper door configured for rotation about an upper axis, step 602. A coupler linkage connected from the upper door to a lower door rotatable about a lower axis reacts tension induced by the upper door to prevent outward rotation of the upper door, step 604. Upon interruption of laminar flow due to separation or turbulence over the upper door, the suction is reduced, and the upper door rotates downward about the upper axis, step 606. Rotation tendency of the upper door may be enhanced by an aft balance weight proximate a trailing edge of the upper door. The coupler linkage induces a counter-rotation by the lower door about the lower axis to an open position, step 608, allowing air flow from a lower surface of the wing through a flap slot exposed by the open lower door and open upper door, step 610, to enhance stabilized flow on the upper surface aft of the flap slot. Opening of the lower door may be supplemented by a torsion spring exerting a moment about the lower axis for force balance. A hard stop extending from an aft edge of the lower door contacting a coupler, bracket or structural member limits the opening rotation of the lower door, step 612. The hard stop additionally seals the cove of the wing preventing influx of debris, step 614. Upon restoring of laminar flow over the upper surface of the wing, the suction present on the upper door induces upward rotation of the upper door about the upper axis to a closed position, step 616, and the coupler linkage causes downward rotation of the lower door closing the flap slot, step 618. Alignment of the pivot pins in the coupler linkage with the lower axis with the upper and lower doors in the closed position precludes further upward rotation of the upper door and downward rotation of the lower door, step 620. Exerting a moment about the lower axis with the torsion spring offsets any position indeterminacy due to an overcenter configuration of the coupler linkage, step 622.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "forward" and "aft", "upper" and "lower", and "clockwise" and "counterclockwise" are employed to describe relative positioning and motion and other than for the specific implementations disclosed may be substituted or reversed with appropriate descriptors such as "first" and "second", "top" and "bottom" or "right" and "left" depending on orientation of actual implementation.

What is claimed is:

1. A wing stall compensation mechanism, comprising:
    an upper door having forward upper hinge end pivotally coupled to an upper wing structure for rotation about an upper axis and a free aft upper end;
    a lower door having a free aft lower end and a forward lower hinge end pivotally coupled to a lower wing structure for rotation about a lower axis;
    a coupler linkage disposed between and pivotally coupled to the upper door and lower door;
    wherein downward rotation of the upper door in response to wing surface airflow separation causes contraction of the coupler linkage inducing upward rotation of the lower door from a closed position that inhibits airflow through a flap slot to an open position that enables airflow through the flap slot, to thereby restore wing surface airflow effectiveness.

2. The wing stall compensation mechanism of claim 1 further comprising a balance weight attached proximate the aft upper free end of the upper door configured to provide an additional clockwise downward force to the upper door to enhance rotation about the upper axis.

3. The wing stall compensation mechanism of claim 1 further comprising a torsion device providing a moment about the lower axis to urge counterclockwise rotation of the lower door.

4. The wing stall compensation mechanism of claim 1 wherein the coupler linkage comprises:
    an upper bracket depending from the upper door;
    a lower bracket extending from the lower door; and,
    a coupler pivotally connected intermediate the upper bracket and lower bracket.

5. The wing stall compensation mechanism of claim 4 further comprising a hard stop extending from the lower door proximate the aft lower free end and contacting one of the coupler or a depending arm of the upper bracket with the lower door in the open position thereby limiting counterclockwise rotation of the lower door.

6. The wing stall compensation mechanism of claim 5 wherein the coupler linkage limits clockwise rotation of the upper door upon contact of the hard stop with the coupler or depending bracket.

7. The wing stall compensation mechanism of claim 5 wherein the hard stop extends laterally substantially parallel to the upper and lower axes to seal a wing cove with the lower door in the open position.

8. The wing stall compensation mechanism of claim 7 wherein the coupler or depending arm contacted by the hard stop extends laterally substantially parallel to the upper and lower axes to seal the wing cove with the lower door in the open position.

9. The wing stall compensation mechanism of claim 4 further comprising:
    an upper pivot pin pivotally connecting the coupler to the upper bracket;
    a lower pivot pin pivotally connecting the coupler to the lower bracket, the upper pivot pin offset aft and below the upper axis and aft of the lower pivot pin and the lower pivot pin offset above and aft of the lower axis thereby provides counter rotation of the upper and lower doors.

10. The wing stall compensation mechanism of claim 9 wherein the coupler linkage operates as a 4-bar linkage.

11. The wing stall compensation mechanism of claim 9 wherein the upper pivot pin and lower pivot pin are in alignment with the lower axis with the upper and lower doors in the closed position whereby tension in the coupler limits further counterclockwise rotation of the upper door and clockwise rotation of the lower door.

12. A method for stall compensation comprising:
    creating suction on an upper door with laminar flow over an upper surface of a wing, the upper door configured for rotation about an upper axis, and maintaining the upper door in a closed position;
    reacting tension induced by the upper door in a coupler linkage connecting the upper door to a lower door rotatable about a lower axis;
    upon interruption of laminar flow due to separation or turbulence over the upper door with resulting reduced suction, rotating the upper door downward about the upper axis;
    counter-rotating the lower door about the lower axis to an open position with the coupler linkage; and,
    allowing air flow from a lower surface of the wing through a flap slot exposed by the open lower door and open upper door to enhance stabilized flow on an upper surface aft of the flap slot.

13. The method of claim 12 further comprising enhancing rotation tendency of the upper door with an aft balance weight proximate a trailing edge of the upper door.

14. The method of claim 12 further comprising supplementing opening of the lower door by a torsion spring exerting a moment about the lower axis for force balance.

15. The method of claim 12 further comprising contacting a coupler, bracket or structural member with a hard stop extending from an aft edge of the lower door thereby limiting opening rotation of the lower door.

16. The method of claim 15 further comprising sealing a cove of the wing with the hard stop preventing influx of debris.

17. The method of claim 12 further comprising upwardly rotating the upper door about the upper axis to a closed position upon restoring of laminar flow over the upper surface of the wing providing suction on the upper door.

18. The method as defined in claim 17 further comprising downwardly rotating the lower door responsive to the coupler linkage closing the flap slot.

19. The method of claim 18 further comprising aligning pivot pins in the coupler linkage with the lower axis producing tension in a coupler between the pivot pins to preclude further upward rotation of the upper door and downward rotation of the lower door past the closed position.

20. The method of claim 19 further comprising exerting a moment about the lower axis with a torsion spring to offset position indeterminacy due to an overcenter configuration of the coupler linkage.

\* \* \* \* \*